April 2, 1968 W. C. SMITH 3,376,376

MINIATURE TRANSISTOR ENCLOSED IN A GLASS DISC-SHAPED HOUSING

Filed June 16, 1964

INVENTOR.
WILLIAM C. SMITH

BY

Sughrue, Rothwell, Mion, Zinn & Macpeak

ATTORNEYS

United States Patent Office 3,376,376

Patented Apr. 2, 1968

3,376,376

MINIATURE TRANSISTOR ENCLOSED IN A GLASS DISC-SHAPED HOUSING

William C. Smith, Corning, N.Y., assignor to Corning Glass Works, Corning, N.Y., a corporation of New York Filed June 16, 1964, Ser. No. 375,511
1 Claim. (Cl. 174—52)

This invention relates to improvements in enclosures and the methods of manufacturing enclosures of glass or similar vitreous materials for lead attached semiconductors such as transistors.

It has been recognized in the prior art that glass is practically an ideal material for the support and housing of semiconductor components such as transistors and the like. In fact, efforts have been made in the prior art to provide the entire housing for semiconductor components of glass or similar vitreous materials and hermetically sealing the active device within the housing. However, in order to provide a seal for an all-glass housing, it is necessary to apply heat for soldering or sealing the housing. In the application of heat to the prior known constructions, the active device being sealed was sometimes overheated and subjected to heat damage. It is an object of this invention to provide an all-glass housing for an active device having three leads in which the possibility of heat damage to the active device is minimized by providing very small sealing areas.

Another problem encountered in the prior art designs of glass enclosures for semiconductor components is that of cracking of the housing after cooling following heat sealing. It is another object of this invention to eliminate the problem of housing cracking upon cooling after heat sealing.

A further object of this invention is to provide a method of making and sealing a glass housing for a transistor by using a unique wiping technique.

The foregoing and other objects, features and advantages of the invention will be apparent from the following more particular description of a preferred embodiment of the invention, as illustrated in the accompanying drawings.

Figures 1, 2, 3:
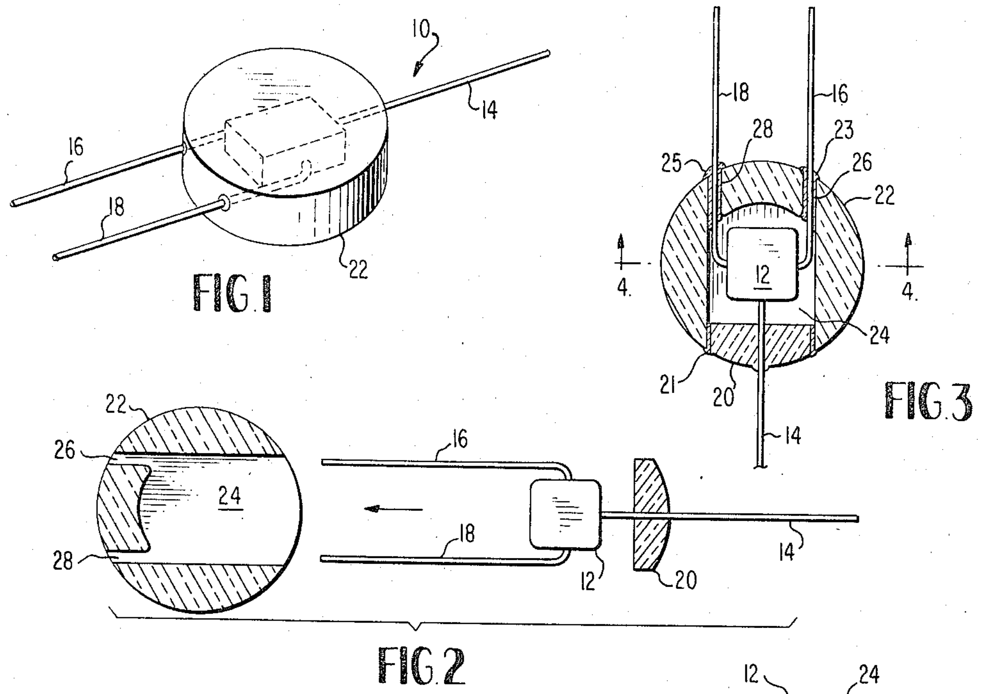
FIG. 1 is a perspective view of the semiconductor housing of this invention showing the active device therein in dotted lines.
FIG. 2 is an exploded view of the housing in section and the active device showing the arrangement of flexible leads of the active device for insertion into the housing and the glass bead molded on one lead.
FIG. 3 is a sectional view of the housing with the active device hermetically sealed therein.
Figure 4:
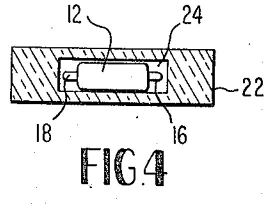
FIG. 4 is a sectional view taken on line 4—4 of FIG. 3.

In the making of semiconductors and housings therefor, the ideal material for the housing is glass. However, in hermetically sealing the active device within the housing, heat must be applied and if the heat is applied for a long time or to a large area, damage will result; either heat damage to the active device, or stress damage to the housing upon sealing, or both. The present invention provides a housing for an active device including a hole in a body of glass just larger than the active device. One lead of the active device has a bead of glass thereon just smaller than the hole to seal the hole after the active device is placed in the housing. Other holes are formed in the housing to accommodate other leads of the active device and these holes connect with the large hole accommodating the active device. A solder glass seal is provided around the housing openings for the leads and the bead. Since the sealing lines of these openings are small in length and spaced apart, undue stresses are not created, and the amount of heat applied is correspondingly small and will not cause overheating and damage to the active device being sealed.

Referring to the drawings, the finished active device in the all-glass housing is indicated generally at 10. The active device 12 includes a lead 14 of suitable conductive material such as fine platinum, or Sylvania #4 alloy wire and a pair of other leads 16 and 18. A glass bead 20 of predetermined shape and size is molded and formed on lead 14, preferably before this lead is attached to the active device 12.

The complete enclosure includes a housing 22 molded from powdered glass or otherwise suitably formed and in a preferred embodiment is shaped as a disk having flat sides. If opacity of the glass enclosure is desired oxide coloring agents may be added to the powdered glass. Within the housing there is a centrally positioned active device accommodating blind hole 24 of a size and shape to receive the active device 12. Opening into the hole 24 from other sides of the housing 22 are an additional pair of smaller lead accommodating holes 26 and 28. These holes are of a diameter slightly larger than the diameter of leads 16 and 18.

As can be seen, the active device 12 with leads 14, 16 and 18 attached and bead 20 on lead 14, is positioned in hole 24 with leads 16 and 18 extending through holes 26 and 28. The bead 20 is of a size and shape so that it fits within the hole 24 and covers the top thereof.

A solder glass seal 21 is then provided around the periphery of bead 20 at the top of hole 24 and housing 22 and further solder glass seals 23 and 25 are made around the leads 16 and 18 where they protrude from holes 26 and 28 in housing 22. "Solder glass" is a term applied to any glass which has a melting temperature lower than the glass body to which it may be fused. It may be used to joint two glass bodies together such as bead 20 and housing 22 or join a glass and metal such as housing 22 and leads 16 or 18. Solder glass is softened or fused by locally applied heat such as flame or hot wire or by placing the entire article in a furnace. The solder glass and the glass body must share the characteristic of thermal expansion so closely that upon cooling to room temperature the resultant stress will be negligible.

Figure 5:
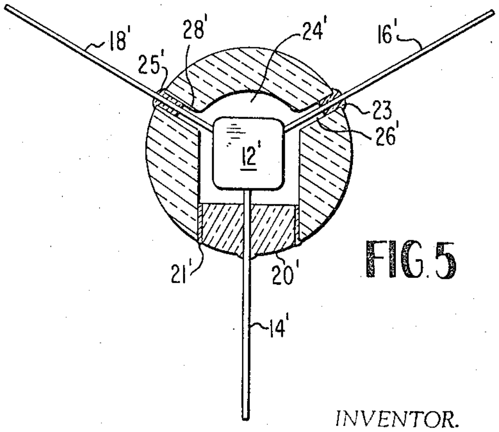
FIG. 5 is a sectional view showing a modification of the housing with the active device sealed therein in accordance with this invention.

The leads extending from the active device may be at 120° angles to one another or at other angles and they need not be parallel as disclosed in the FIGS. 1–4 embodiment. For example, the leads may be positioned at 120° to one another as shown in the FIG. 5 embodiment. In FIG. 5 the reference numerals are primed to indicate like components of the FIGS. 1–4 embodiment. The leads in all of the embodiments are of such flexibility that they may be bent during insertion into the housing.

Figure 6:
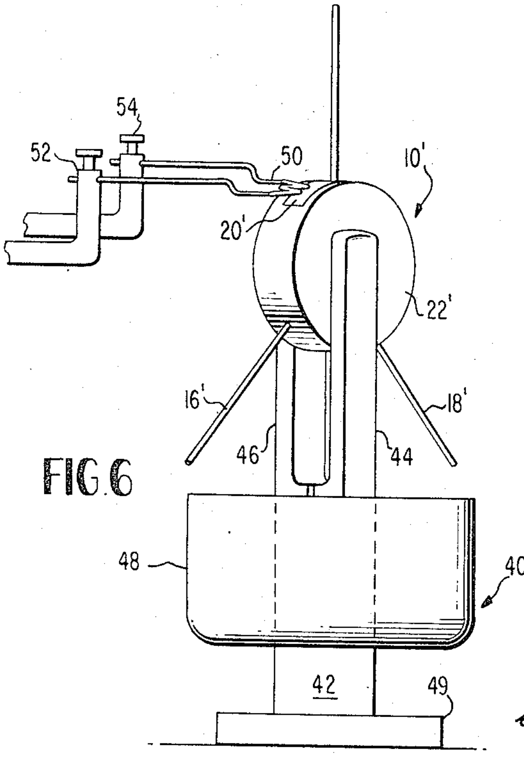
FIG. 6 is a perspective illustrative showing of the method of making and sealing the active device within the glass housing.

A unique technique for sealing the leads in the enclosure is shown in FIG. 6. More particularly, the active device in the enclosure housing of the FIG. 5 embodiment, 10', is positioned in a jig 40. This jig includes a rotatable heat sink 42 having bifurcated arms 44 and 46 sandwiching the sides of the enclosure disk housing 22'. A container 48 for dry ice is positioned around the copper heat sink to cool the sink and drain the heat away from the active device 12' within the housing 22'. The jig may be rotated on base 49 during the sealing by soldering around leads 16' and 18'. For solder glass sealing around the leads 16', 18' and bead 20', there is provided a heated wire 50 of platinum or the like connected to suitable terminals 52 and 54 in an arrangement which may be semi-manual in that it is movable for positioning the tip of wire 50 for solder glass sealing. The solder glass is in the form of powder which, when heated on the tip of the wire, forms a glass droplet. With the enclosure 10' in the position of FIG. 6 the heated wire with the glass droplet thereon is moved to wipe the solder onto edge of the bead 20' and opening 24' and form a seal around the edge of the bead 20'. For sealing around the edges of leads 16' and 18' the housing 22' is rotated about its axis and repositioned in the bifurcated heat sink with the particular lead to be sealed positioned to extend upwardly. Then the heated wire 50 is positioned adjacent the lead (16' or 18') and the jig 40 is rotated to accomplish the solder glass sealing around the wire. In a similar manner the other lead is sealed.

It can be seen that applicant has provided a unique glass enclosure for hermetically sealing the active device of a semiconductor or the like by providing a hole in a glass housing of such a size and shape to receive the active device with a small bit of space to spare and additional holes in the housing for bare leads attached to the active device, the active device including a further lead extending out of the large hole and having a bead thereon slightly smaller than the size and shape of the hole in order to be sealed thereto by solder glass, the solder glass also being used to seal the bare leads to the housing. With this arrangement heat damage during the sealing and the cracking of the housing due to shrinkage has been eliminated.

While the invention has been particularly shown and described with reference to preferred embodiments thereof, it will be understood by those skilled in the art that the foregoing and other changes in form and details may be made therein without departing from the spirit and scope of the invention.

I claim:

1. An electronic active device and housing therefor comprising: an active device having at least two leads extending therefrom, a glass bead molded on one of said leads and having an area when viewed from the end of the lead on which it is molded at least as great as the correspondingly viewed area of active device, an all glass disc shaped housing including means defining a blind bore in a curved edge of the disc for accommodating the active device with slight room to spare, the area across the entrance of the blind hole being substantially the same size and shape as the glass bead molded to the lead, but having dimensions substantially less than the corresponding dimensions of said disc when viewed in a direction looking into said blind hole, at least one other smaller hole in the housing extending to the blind hole for accommodating the other lead attached to the active device, and solder glass seals hermetically sealing the active device within the housing by sealing around the glass bead where it is received in the blind bore and around the lead where is passes and the other and smaller hole in the housing.

References Cited

UNITED STATES PATENTS

| | | | |
|---|---|---|---|
| 3,280,390 | 10/1966 | Rossle et al. | 317—235 |
| 2,212,556 | 8/1940 | Baier | 174—50.58 X |
| 2,868,862 | 1/1959 | Petri | 174—50.57 |

DARRELL L. CLAY, *Primary Examiner.*

L. H. MYERS, *Examiner.*

H. COLLINS, D. A. TONE, *Assistant Examiners.*